US008078826B2

(12) United States Patent
Mukherjee (10) Patent No.: US 8,078,826 B2
(45) Date of Patent: Dec. 13, 2011

(54) EFFECTIVE MEMORY CLUSTERING TO MINIMIZE PAGE FAULT AND OPTIMIZE MEMORY UTILIZATION

(75) Inventor: Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 12/421,879

(22) Filed: Apr. 10, 2009

(65) Prior Publication Data
US 2010/0262804 A1 Oct. 14, 2010

(51) Int. Cl.
*G06F 12/00* (2006.01)
(52) U.S. Cl. ............. 711/203; 711/3; 711/136; 711/160
(58) Field of Classification Search .................. 711/203, 711/3, 160, 136
See application file for complete search history.

(56) References Cited

U.S. PATENT DOCUMENTS

| 6,094,715 | A | 7/2000 | Wilkinson et al. | |
|---|---|---|---|---|
| 7,234,038 | B1 * | 6/2007 | Durrant | 711/203 |
| 2004/0162952 | A1 | 8/2004 | Feind et al. | |
| 2005/0273571 | A1 * | 12/2005 | Lyon et al. | 711/203 |

OTHER PUBLICATIONS

Shacham, et al., On the Effectiveness of Address-Space Randomization, CCS '04, Oct. 25-29, 2004, Washington, DC, USA, pp. 298-307.
Azimi, et al., PATH: Page Access Tracking to Improve Memory Management, ISMM '07, Oct. 21-22, 2007, Montreal, Quebec, Canada, pp. 31-42.
Manassiev, et al., Exploiting Distributed Version Concurrency in a Transactional Memory Cluster, PPoPP '06, Mar. 29-31, 2006, New York, New York, USA, pp. 198-208.

* cited by examiner

*Primary Examiner* — Son Dinh
(74) *Attorney, Agent, or Firm* — Cahn & Samuels, LLP (57) ABSTRACT

An embodiment of the invention provides a method for effective memory clustering to minimize page faults and optimize memory utilization. More specifically, the method monitors data access requests to secondary storage and identifies data addresses in secondary storage having similar properties. Multi-dimensional clusters are created based on the monitoring to group the data addresses having similar properties. A memory page is created from a multi-dimensional cluster, wherein a cross-sectional partition is created (sliced) from the multi-dimensional cluster. The method receives a request for a data object in secondary storage and identifies a data address corresponding to the requested data object. The data address is mapped to the multi-dimensional cluster and/or the memory page; and, the memory page is transferred to a data cache in primary storage.

25 Claims, 9 Drawing Sheets

EFFECTIVE MEMORY CLUSTERING TO MINIMIZE PAGE FAULT AND OPTIMIZE MEMORY UTILIZATION

I. FIELD OF THE INVENTION

The present invention is in the field of systems, methods, and computer program products for effective memory clustering to minimize page faults and optimize memory utilization.

II. BACKGROUND OF THE INVENTION

When a request for data is received by the CPU, all of the pages available in the cache are searched. If the requested data is not available, the next lower level of the memory hierarchy is searched until the page containing the data is located. The page containing the requested data is then fetched and stored at each hierarchy level up to the cache. If the cache or any memory level in the hierarchy is full, the recently obtained page replaces an existing page. The CPU then accesses the data from the cache.

In many applications involving multidimensional data, the memory associativity includes more than row and column associativity. Examples of such applications include large data mining applications in multidimensional data space. Applications running on a multi-threaded, multi-process, and/or multi-core system may also have memory associativity in addition to row and column associativity. Data paging involving only row or column association may pull in only a small subset of data up and down the memory hierarchy. This may lead numerous page faults and slower computer processing.

III. SUMMARY OF THE INVENTION

An embodiment of the invention provides a method for effective memory clustering to minimize page faults and optimize memory utilization. More specifically, the method monitors data access requests to secondary storage (e.g., one or more hard drives), including identifying data addresses in secondary storage having similar properties (e.g., location, access frequency). Based on the monitoring, multi-dimensional clusters (e.g., two-dimensional convex hull cluster, ellipsoid cluster, three-dimensional convex hull cluster) are created in a virtual address space to group data addresses having similar properties.

The method identifies a major axis (the longest diameter) in a multi-dimensional cluster and creates a two-dimensional memory page from the multi-dimensional cluster. This includes creating a cross-sectional partition from the multi-dimensional cluster that is parallel to the major axis to increase the number of data addresses in the memory page.

The method receives a request for a data object in secondary storage and identifies a data address corresponding to the requested data object. The data address is mapped to the multi-dimensional cluster and/or the memory page; and, the memory page is transferred to a data cache in primary storage. In at least one embodiment of the invention, the method receives updated monitoring of the data access requests. The data addresses are un-clustered and re-clustered based on the updated monitoring of the data access requests.

IV. BRIEF DESCRIPTION OF THE DRAWINGS

The present invention is described with reference to the accompanying drawings. In the drawings, like reference numbers indicate identical or functionally similar elements.

V. DETAILED DESCRIPTION OF THE DRAWINGS

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
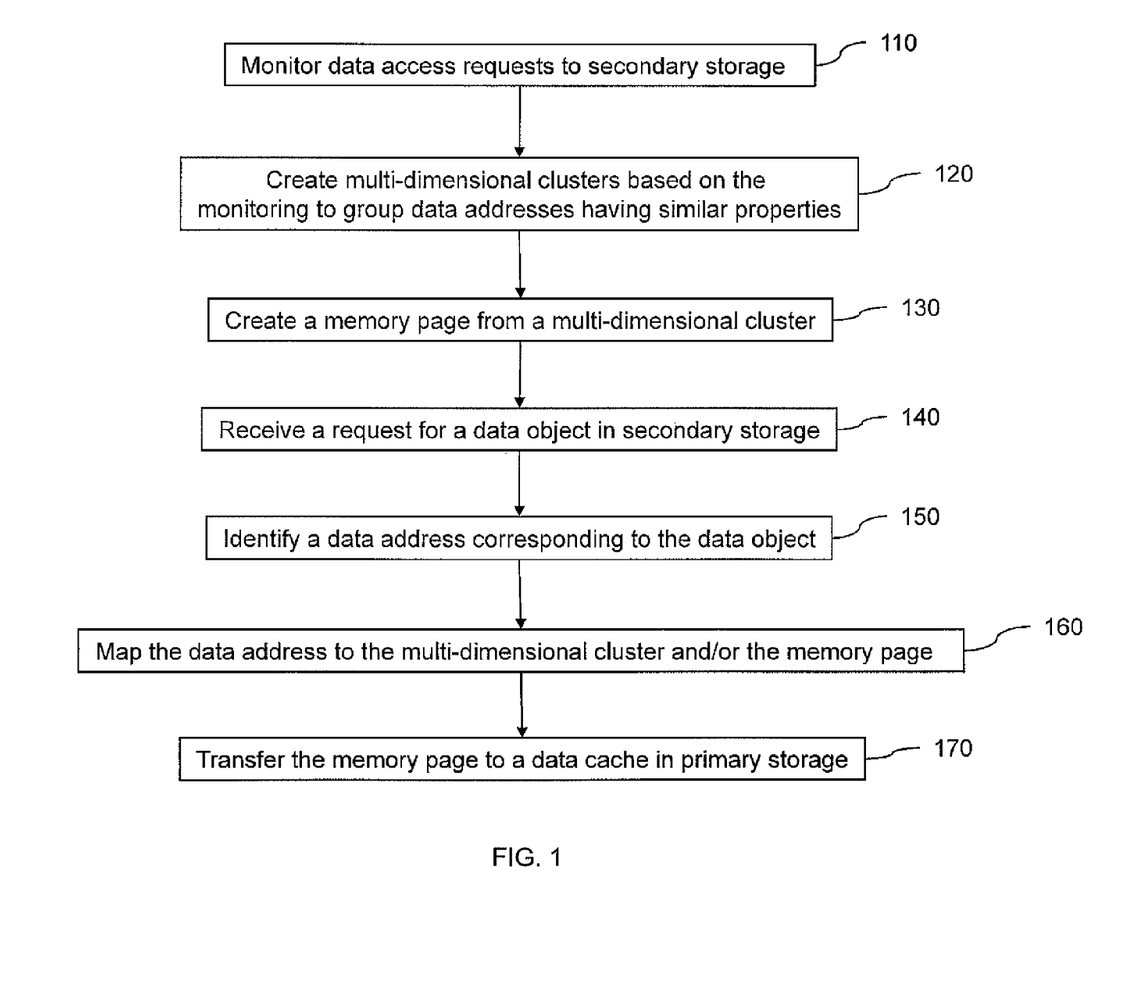
FIG. 1 illustrates a flow diagram of a method for effective memory clustering to minimize page faults and optimize memory utilization according to an embodiment of the invention.

FIG. 1 provides a general overview of one method for memory utilization according to an embodiment of the invention. Details of this and other embodiments of the invention are described below with reference to FIGS. 2-11. A method 100 monitors data access requests to secondary storage and identifies data addresses in secondary storage having similar properties (110). Multi-dimensional clusters are created based on the monitoring to group the data addresses having similar properties (120). A memory page is created from a multi-dimensional cluster, wherein a cross-sectional partition is created (sliced) from the multi-dimensional cluster (130). The method 100 receives a request for a data object in secondary storage (140) and identifies a data address corresponding to the requested data object (150). The data address is mapped to the multi-dimensional cluster and/or the memory page (160); and, the memory page is transferred to a data cache in primary storage (170).

Figure 2:
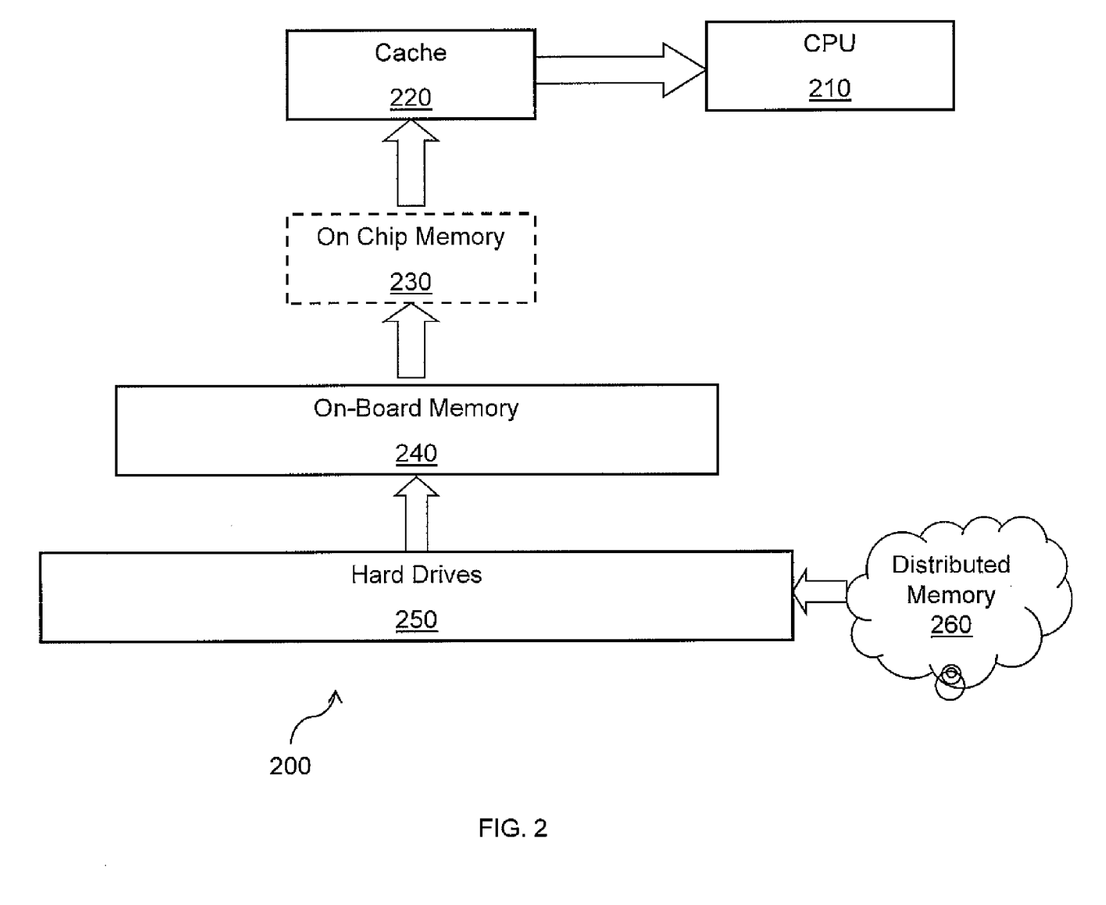
FIG. 2 illustrates a memory hierarchy scheme according to an embodiment of the invention.

FIG. 2 illustrates a memory hierarchy scheme 200 including a CPU 210 and primary storage units (cache 220, on-chip memory 230, and on-board memory 240 (e.g., RAM)). The memory hierarchy scheme 200 also includes secondary storage units (hard drives 250 and distributed memory 260). The speed of memory access by the CPU 210 increases up the memory hierarchy scheme 200; and, the unit cost decreases down the memory hierarchy scheme 200. The process of transferring data from secondary storage to primary storage is referred to as "paging". Virtual memory schemes use paging to store data that does not fit into physical RAM.

Figure 3:
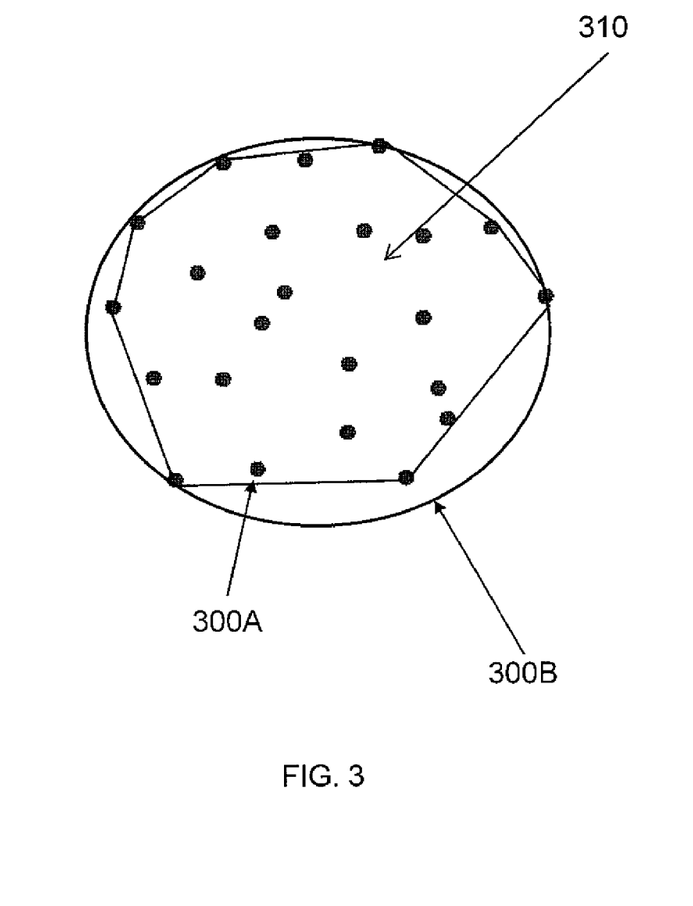
FIG. 3 illustrates a cluster according to an embodiment of the invention.

FIG. 3 illustrates clusters 300A and 300B of data addresses 310 according to an embodiment of the invention. Each data address 310 corresponds to a data object in secondary storage (e.g., a first hard drive and a second hard drive). The clusters 300A, 300B are created based on monitored data access requests to secondary storage, wherein data addresses 310 having similar properties (e.g., location, access frequency, relationships with other data addresses) are grouped together. In at least one embodiment of the invention, clusters are updated to reflect changes in data access patterns. Specifically, the data addresses 310 are unclustered, and subsequently re-clustered based on updated monitoring of the data access requests.

Figure 4:
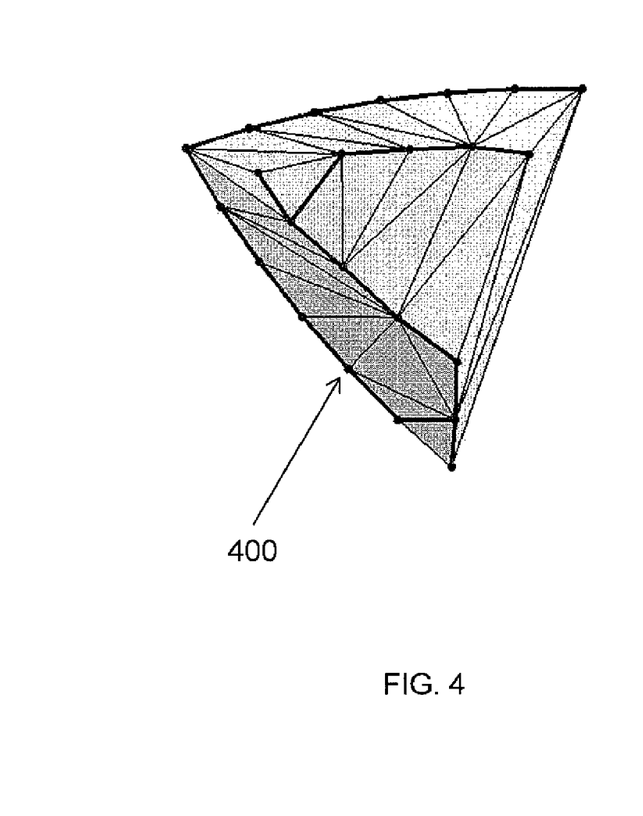
FIG. 4 illustrates a cluster according to another embodiment of the invention.

In at least one embodiment of the invention, clustering of the data addresses 310 is performed using distance metrics, for example, the L1 metric or the Manhattan distance, the L2 metric or Euclidean, or the $L_{infinity}$ or the Maximum metric. FIG. 3 illustrates two clusters of the same data addresses: a two-dimensional convex hull cluster 300A and an ellipsoid cluster 300B. FIG. 4 illustrates a three-dimensional convex hull cluster 400 (also referred to as a gift wrapper or polyhedron cluster). The three-dimensional convex hull cluster 400 includes the tightest (i.e., most closely related) grouping of data addresses 310; the grouping in the ellipsoid cluster 300B is less tight.

In one embodiment of the invention, the clusters are created by identifying one or more orthogonal bounding boxes that enclose the data addresses 310. The clustering of the data addresses 310 does not have to be exact. An appropriate approximation of the two-dimensional convex hull cluster 300A, the ellipsoid cluster 300B, or the three-dimensional convex hull cluster 400 may be used.

At least one embodiment of the invention utilizes inclusion tests to determine whether a data address is located within a cluster. In a two dimensional area, an infinite line is written in the equation: px+qy=v, where x and y correspond to the X and Y dimensions, respectively. This line divides the X-Y plane into two halves. Any points on one half satisfies the inequality px+qy>v. Points on the other side satisfy the inequality: px+qy<v. A convex polygon with n sides is expressed by a set of inequalities of the form {p_ix+q_iy<v_i, for i=1, ..., n}.

Similarly, in a three-dimensional area, an infinite plane is defined by the equation: px+qy+ry=n. This line divides the X-Y-Z three dimensional space into two halves. Any points on one half satisfies the inequality px+qy+rz>n. Points on the other side of the plane satisfy the inequality: px+qy+rz<n. A convex polyhedron with n surfaces is expressed by a set of inequalities of the form {$p_{13}$ix+q_iy+$r_{13}$iz<$v_{13}$i, for i=1, ..., n}.

In a hyperspace with m dimensions {$x_{13}$j, j=1, ..., m}, a hyperplane is defined in terms of m dimensions as: (a1)(x1)+(a2)(x2)+(a3)(x3)+ ... +(am)(xm)=v. Any points on one half satisfy the inequality (a1)(x1)+(a2)(x2)+(a3)(x3)+ ... +(am)(xm)>v. Points on the other side satisfy the inequality: (a1)(x1)+(a2)(x2)+(a3)(x3)+ ... +am. xm<v. The above is also written in a Vector Notation: ax<v. Where a=[a1, a2, a3, ..., am], x=[x1, x2, x3, ..., xm], and v=[v1, v2, v3, ..., vm]. The cluster is therefore represented by a convex polyhedron. Any point that is inside the cluster satisfies the equation ax<v.

Similar concepts are applied in the case of an ellipsoid. In two dimensions, an ellipse is defined as $(x-h)^2/a^2+(y-k)^2/b^2=1$. Point (h, k) defines the center of the ellipse; and, a and b define the aspect ratio. Points within the ellipse satisfy the inequality: $(x-h)^2/a^2+(y-k)^2/b^2<1$. In the case of three-dimensional ellipsoids, points within the ellipsoid satisfy the inequality: $(x-h)^2/a^2+(y-k)^2/b^2+(z-g)^2/c^2<1$. In case of an m dimensional hyperspace, points within an ellipsoid satisfy the inequality $(x-x_0)^T M(x-x_0)<d^2$. Here, x=[x1, x2, ..., xm] and is an m-dimensional vector; $x_0$=[x01, x02, ..., x0m] and denotes the center of the ellipse; and, d=[d1, d2, ..., dm] and denotes the radius of the ellipse. M is a m×m matrix denoting the m-dimensional aspect ratio as well as the orientation of the ellipsoid. A data address is within a three-dimensional convex hull cluster if ax<v. Here, a=[a1, a2, a3, ..., am]; x=[x1, x2, x3, ..., xm]; and, v=[v1, v2, v3, ..., vm].

Although convex hulls of clusters are illustrated in FIGS. 3 and 4, other types of tight clusters can be created. In one embodiment, ellipsoidal or spherical clusters in a D-dimensional space (D≧2) are used to partition the virtual address space. In another embodiment, clusters are modeled with convex functions, such as the Gaussian function.

Supervised clustering and/or unsupervised clustering are utilized to create clusters. In supervised clustering, the number of clusters is known a-priori. In un-supervised clustering, the number of clusters is not known a-priori. A clustering algorithm decides the best number of clusters based on the distance metric or other specified properties.

Figure 5:
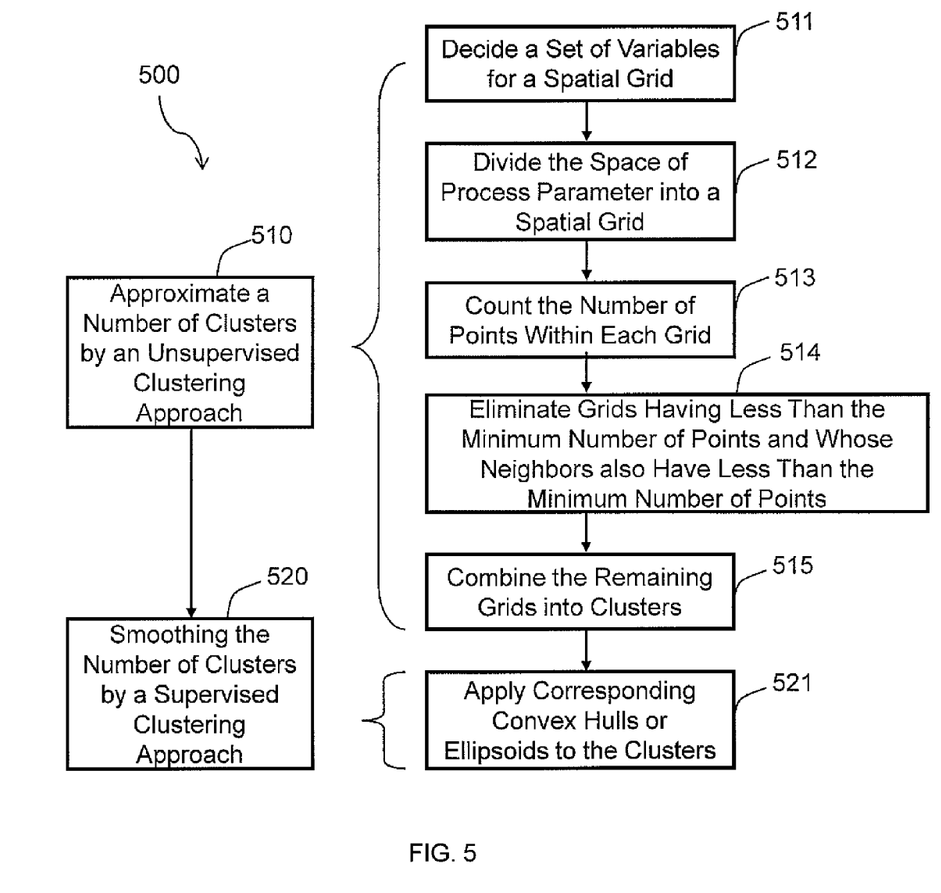
FIG. 5 is a flowchart illustrating a method of clustering according to another embodiment of the invention.

According to one embodiment of the invention, FIG. 5 is a flowchart illustrating a method of clustering based on calibration data. A method 500 approximates a number of clusters by applying an unsupervised clustering approach, e.g., a grid based clustering approach (510). The method 500 then smoothes the number of clusters by applying a supervised clustering approach (520).

By applying an unsupervised clustering approach, the method 500 decides a set of variables for a spatial grid (511). The variables include, among others: a dimensional variable from model calibration with a minimum and maximum value; the number of divisions for each dimension (e.g., a number (e.g., 10) to bin or separate process parameters obtained from model calibration); and, a minimum number of points in a grid (e.g., 0.2% of the total number of data points for a grid to be eliminated). The points may be image parameters or process parameters associated with the calibration data points.

The space of process parameters, in all the given dimensions, is divided into a spatial grid according to the decided division (512). Within each grid block, the number of process parameters or data points is counted (513). If the number of points or process parameters inside a grid is less than the decided minimum number of points and whose neighbors also have points less than the minimum number, the grid block is eliminated (514).

The remaining grid blocks are combined into clusters, where each cluster is separated from its neighbors by eliminated grid blocks (515). The clusters are smoothed by a supervised clustering approach (520). In one embodiment, convex hulls and/or ellipsoids corresponding to the clusters are used to create smoothed tight clusters (521).

Figure 6:
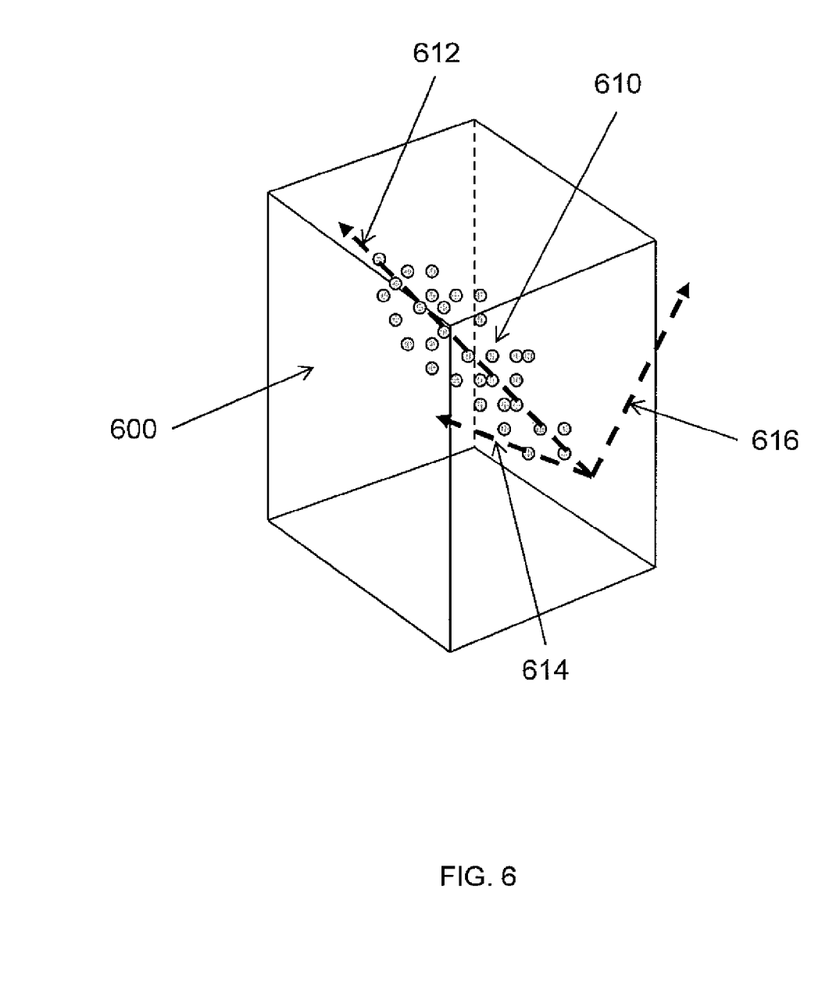
FIG. 6 illustrates a cluster in a virtual address space according to another embodiment of the invention.

FIG. 6 illustrates a three-dimensional cluster 610 in a virtual address space 600. The virtual address space 600 includes physical storage components in both primary storage (e.g., L1 cache, L2 cache, RAM) and secondary storage (e.g., hard drives). The virtual address space 600 extends physical memory size onto secondary storage while giving a software application running on the computer system the impression that it is using contiguous working memory. An embodiment of the invention identifies a major axis 612, a minor axis 614, and a minor axis 616 of the cluster 610. The major axis 612 is the longest diameter of the cluster 610. Thus, the major axis 612 runs through the center of the cluster 610 with its ends being at the widest points of the cluster 610.

More specifically, the major axis is determined by the straight line that connects the two points of the highest curvature of the ellipse. The curvature of a surface is defined by the parametric derivative of the surface, such as ellipsoid. In an m-dimensional ellipsoid defined by $(x-x_0)^T M(x-x_0) < d^2$, the major axis is defined by the first eigenvector of the Matrix M.

Figure 7:
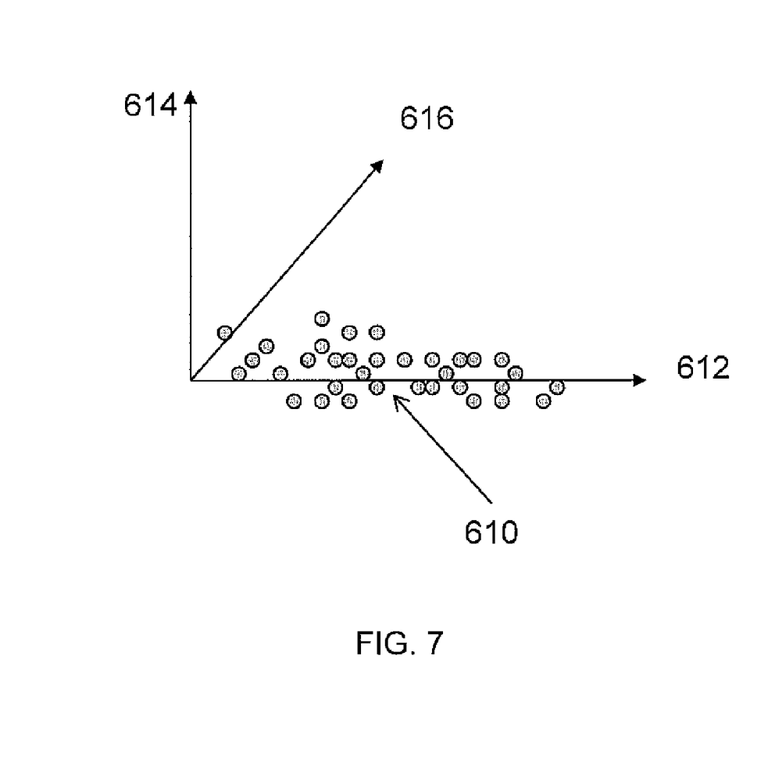
FIG. 7 illustrates the major axis of the cluster in FIG. 6.
Figure 8:
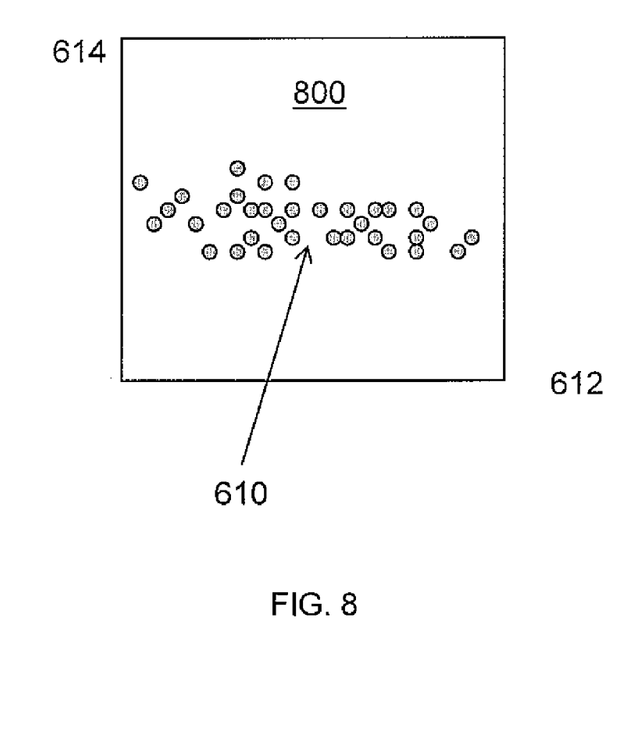
FIG. 8 illustrates a memory page according to an embodiment of the invention.

FIG. 7 is a diagram illustrating the cluster 610 reoriented with respect to the major axis 612. Having identified the major axis 612 of the cluster 610, the cluster 610 can be partitioned to maximize the number of data points (e.g., data addresses 610) located within each partition. More specifically, an embodiment of the invention creates one or more two-dimensional memory pages from the cluster by partitioning the cluster along the major axis. As illustrated in FIG. 8, a two-dimensional memory page 800 is created by taking a cross-sectional partition (also referred to as a "slice") of the cluster 610. In order to maximize the number of data addresses 310 in the memory page 800, the partition is parallel to the major axis 612 of the cluster 610. When the memory page 800 is subsequently moved to the cache, as described more fully below, the number of data addresses 310 and corresponding data objects retrieved is maximized.

As described above, if a requested data object cannot be found in the memory cache, each lower storage component in the virtual address space is searched until the requested data object is found. When the requested data object is found, the data address corresponding to the requested data object is identified. The data address is mapped to the cluster and/or the memory page that contains the data address. The memory page is then moved (i.e., fetched) to the cache in primary storage. For example, if the requested data object has a corresponding data address located in the memory page 800, the memory page 800 is copied to the cache and stored in each lower storage component in the virtual address space.

Accordingly, the embodiments of the invention can increase the speed and efficiency of data retrieval from secondary storage. Requests for data typically require more than one data object. As such, multiple data addresses and often times multiple fetches to secondary storage are required to fulfill a data access request. The embodiments herein partition the cluster along the major axis to maximize the number of data addresses located within each memory page. Thus, fewer memory pages, and consequently fewer fetches to secondary storage may be required to satisfy a data access request.

Figure 9:
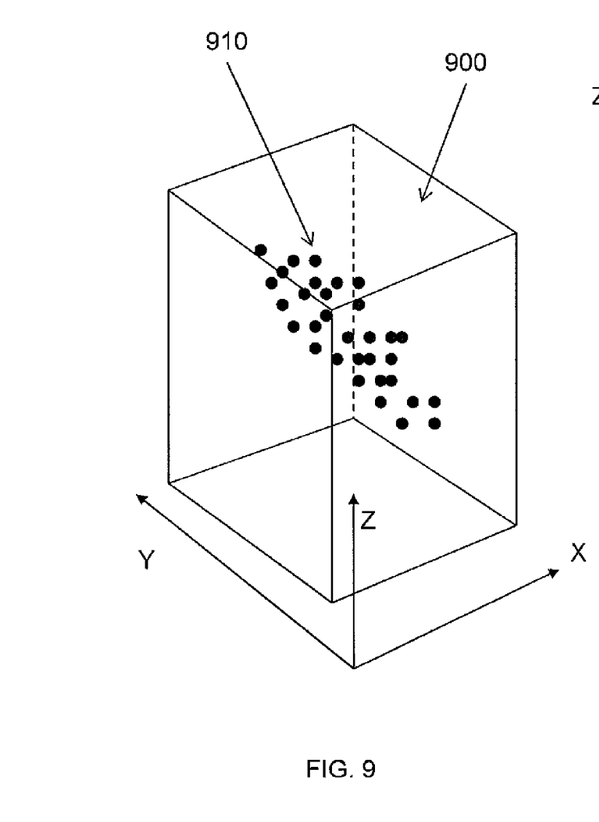
FIG. 9 illustrates a cluster in a virtual address space according to another embodiment of the invention.
Figure 10:
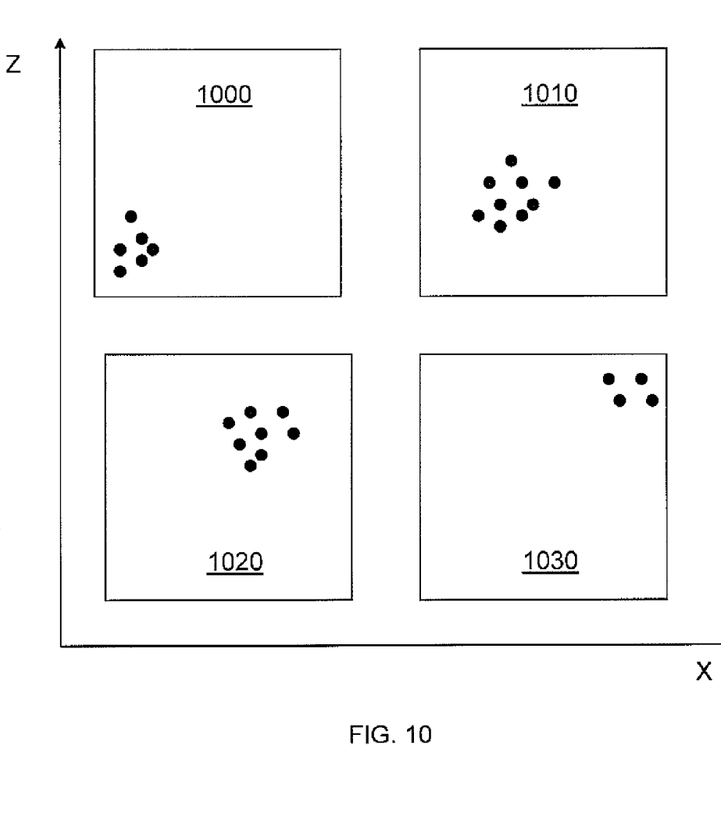
FIG. 10 illustrates memory pages sliced from the cluster illustrated in FIG. 8.

For example, FIG. 9 illustrates a three-dimensional cluster 910 in a virtual address space 900. As further illustrated in FIG. 10, memory pages 1000, 1010, 1020, and 1030 are created from partitions that are "sliced" along the X-Z axis of the virtual address space 900. The partitions are not parallel to the major axis of the cluster 910. A combined total of 27 data addresses are retrieved from the four memory pages (i.e., memory pages 1000, 1010, 1020, and 1030). Conversely, as illustrated in FIG. 8, an embodiment of the invention retrieves the memory page 800, which is created from a partition taken along the major axis of the cluster 610. The single memory page 800 includes 34 data addresses, whereas the four memory pages in FIG. 10 include a combined total of only 27 data addresses.

Figure 11:
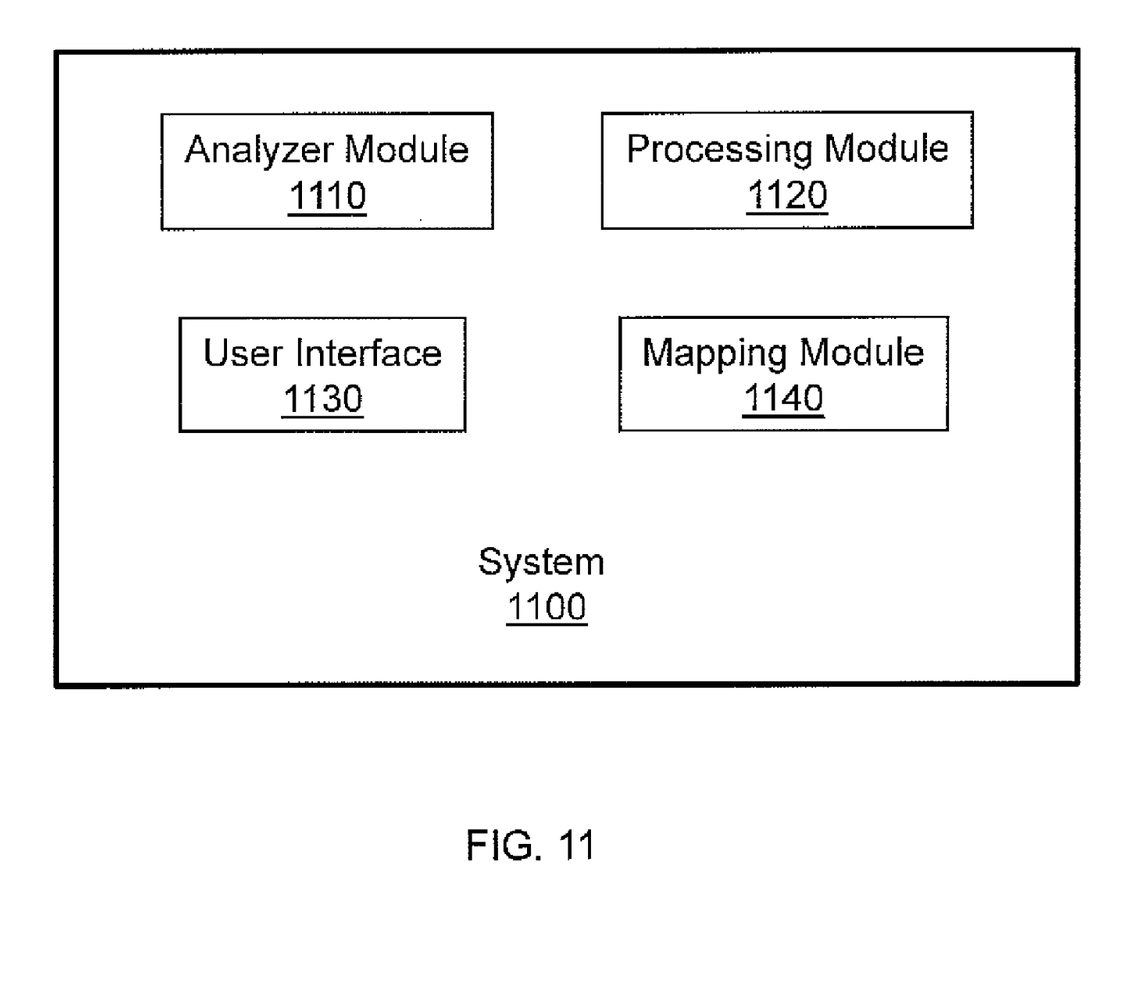
FIG. 11 illustrates a system for performing a method for organizing data addresses within a virtual address space according to another embodiment of the invention.

FIG. 11 illustrates a system 1100 for organizing data addresses within a virtual address space according to an embodiment of the invention. An analyzer module 1110 is provided to monitor data access requests to a secondary storage module and identify data addresses in the secondary storage module having similar properties. A processing module 1120 creates multi-dimensional clusters (e.g., two-dimensional convex hull cluster, ellipsoid cluster, three-dimensional convex hull cluster) in the virtual address space based on the monitoring to group the data addresses having similar properties. The processing module 1120 also creates a memory page from a multi-dimensional cluster, including creating a cross-sectional partition from the multi-dimensional cluster. In at least one embodiment, the processing module 1120 identifies a major axis in the multi-dimensional cluster, wherein the cross-sectional partition is parallel to the major axis. A user interface 1130 sends a request for a data object in the secondary storage module to the processing module 1120; and, a data address corresponding to the requested data object is identified via a mapping module 1140. The mapping module 1140 maps the identified data address to the multi-dimensional cluster and/or the memory page; and, the processing module 1120 transfers the memory page to a data cache in primary storage. Additionally, the processing module 1120 receives updated monitoring of the data access requests from the analyzer module 1110, unclusters the data addresses, and re-clusters the data addresses based on the updated monitoring of the data access requests.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 12:
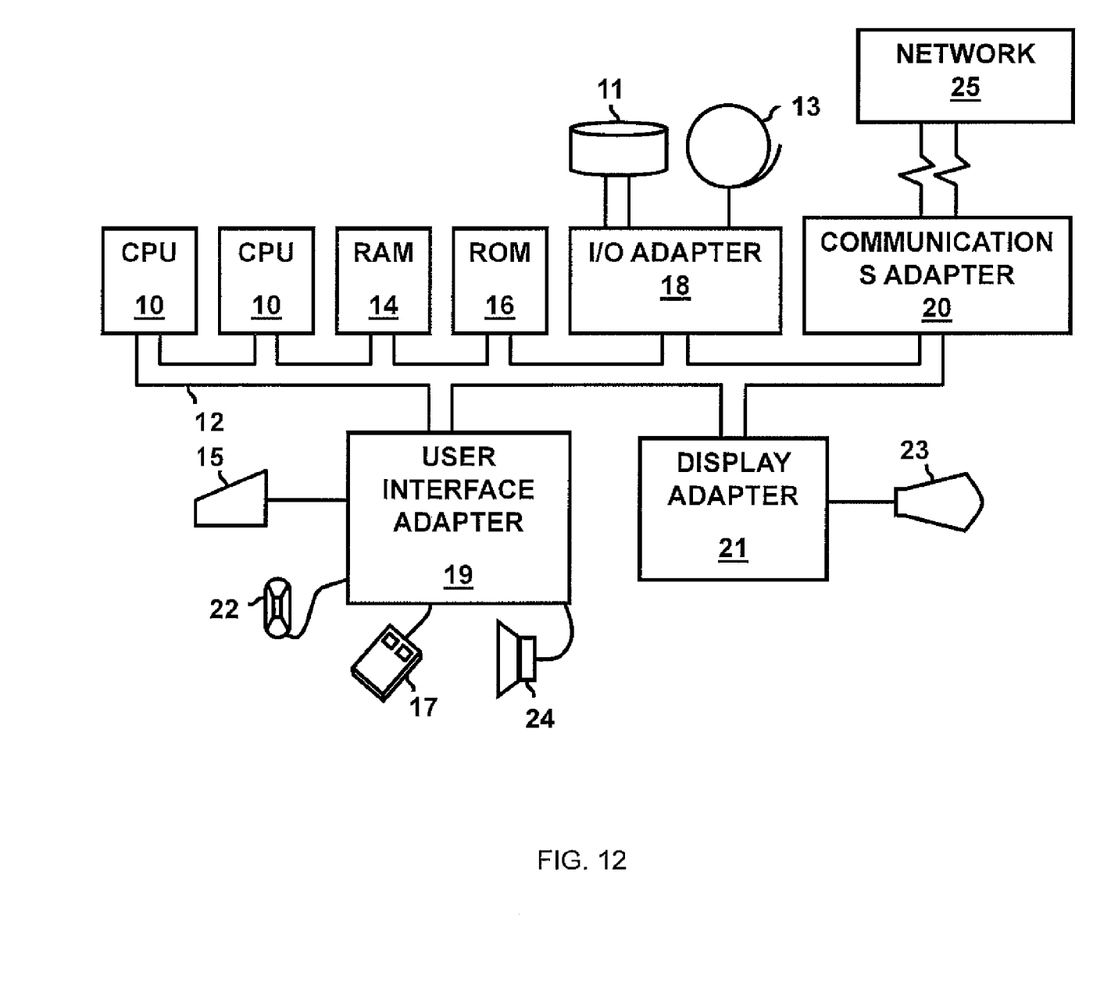
FIG. 12 illustrates a computer program product according to an embodiment of the invention.

Referring now to FIG. 12, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:
1. A method, including:
monitoring data access requests to secondary storage, including identifying data addresses in said secondary storage having similar properties;
creating multi-dimensional clusters based on said monitoring to group said data addresses having similar properties;
creating a memory page from a multi-dimensional cluster of said multi-dimensional clusters, including creating a cross-sectional partition from said multi-dimensional cluster;
receiving a request for a data object in said secondary storage;
identifying a data address corresponding to said data object;
mapping said data address to at least one of said multi-dimensional cluster and said memory page; and
transferring said memory page to a data cache in primary storage.
2. The method according to claim 1, wherein said identifying data addresses in said secondary storage having similar properties includes identifying data addresses having at least one of similar locations and similar access frequency.

3. The method according to claim 1, wherein said creating of said multi-dimensional clusters includes creating multi-dimensional clusters in a virtual address space.

4. The method according to claim 1, wherein said creating of said multi-dimensional clusters includes creating at least one of a two-dimensional convex hull cluster, an ellipsoid cluster, and a three-dimensional convex hull cluster.

5. The method according to claim 1, further including, prior to said creating a memory page, identifying a major axis in said multi-dimensional cluster, wherein said cross-sectional partition is parallel to said major axis.

6. The method according to claim 5, wherein said identifying a major axis includes identifying a longest diameter of said multi-dimensional cluster.

7. The method according to claim 1, wherein said creating of said memory page includes creating a two-dimensional memory page.

8. The method according to claim 1, wherein said creating a cross-sectional partition from said multi-dimensional cluster increases a number of data addresses in said memory page.

9. The method according to claim 1, wherein said monitoring data access requests to secondary storage includes monitoring data access requests to at least one hard drive.

10. The method according to claim 1, further including:
receiving updated monitoring of said data access requests;
un-clustering said data addresses; and
re-clustering said data addresses based on said updated monitoring of said data access requests.

11. A method for organizing data addresses within a virtual address space to reduce the number of data fetches to a secondary storage module, said method including:
monitoring data access requests to said secondary storage module via an analyzer module, said monitoring including identifying data addresses in said secondary storage module having similar properties;
creating multi-dimensional clusters in said virtual address space via a processing module, said creating of said multi-dimensional clusters based on said monitoring to group said data addresses having similar properties;
creating a memory page from a multi-dimensional cluster of said multi-dimensional clusters via said processing module, said creating of said memory page including creating a cross-sectional partition from said multi-dimensional cluster;
receiving a request from a user interface for a data object in said secondary storage module;
identifying a data address corresponding to said data object in said secondary storage module via a mapping module;
mapping said data address to at least one of said multi-dimensional cluster and said memory page via said mapping module; and
transferring said memory page to a data cache in primary storage.

12. The method according to claim 11, wherein said identifying data addresses in said secondary storage module having similar properties includes identifying data addresses having at least one of similar locations and similar access frequency.

13. The method according to claim 11, wherein said creating of said multi-dimensional clusters includes creating at least one of a two-dimensional convex hull cluster, an ellipsoid cluster, and a three-dimensional convex hull cluster.

14. The method according to claim 11, further including, prior to said creating a memory page, identifying a major axis in said multi-dimensional cluster, wherein said cross-sectional partition is parallel to said major axis.

15. The method according to claim 14, wherein said identifying a major axis includes identifying a longest diameter of said multi-dimensional cluster.

16. The method according to claim 11, wherein said creating of said memory page includes creating a two-dimensional memory page.

17. The method according to claim 11, wherein said creating a cross-sectional partition from said multi-dimensional cluster increases a number of data addresses in said memory page.

18. The method according to claim 11, wherein said monitoring data access requests to secondary storage module includes monitoring data access requests to at least one hard drive.

19. The method according to claim 11, further including:
receiving updated monitoring of said data access requests;
un-clustering said data addresses; and
re-clustering said data addresses based on said updated monitoring of said data access requests.

20. A system, including:
an analyzer module for monitoring data access requests to a secondary storage module and identifying data addresses in said secondary storage module having similar properties;
a processing module for
creating multi-dimensional clusters in said virtual address space based on said monitoring of said analyzer module to group said data addresses having similar properties,
creating a memory page from a multi-dimensional cluster of said multi-dimensional clusters, including creating a cross-sectional partition from said multi-dimensional cluster, and
transferring said memory page to a data cache in primary storage;
a user interface for sending a request for a data object in said secondary storage module to said processing module; and
a mapping module for identifying a data address corresponding to said data object in said secondary storage module via and mapping said data address to at least one of said multi-dimensional cluster and said memory page.

21. The system according to claim 20, wherein said multi-dimensional clusters include at least one of a two-dimensional convex hull cluster, an ellipsoid cluster, and a three-dimensional convex hull cluster.

22. The system according to claim 20, wherein said processing module identifies a major axis in said multi-dimensional cluster, and wherein said cross-sectional partition is parallel to said major axis.

23. The system according to claim 20, wherein said processing module
receives updated monitoring of said data access requests from said analyzer module;
un-clusters said data addresses; and
re-clusters said data addresses based on said updated monitoring of said data access requests from said analyzer module.

24. A computer program product for performing a method for organizing data addresses within a virtual address space to reduce the number of data fetches to secondary storage, said computer program product including:

first program instructions to monitor data access requests to said secondary storage and identify data addresses in said secondary storage having similar properties;
second program instructions to create multi-dimensional clusters in said virtual address space based on said monitoring to group said data addresses having similar properties;
third program instructions to create a memory page from a multi-dimensional cluster of said multi-dimensional clusters and create a cross-sectional partition from said multi-dimensional cluster;
fourth program instructions to receive a request for a data object in said secondary storage;
fifth program instructions to identify a data address corresponding to said data object;
sixth program instructions to map said data address to at least one of said multi-dimensional cluster and said memory page;
seventh program instructions to transfer said memory page to a data cache in primary storage; and
a computer readable medium, said first program instructions, said second program instructions, said third program instructions, said fourth program instructions, said fifth program instructions, said sixth program instructions, and said seventh program instructions are stored on said computer readable media.

25. The computer program product according to claim 24, further including eight program instructions to identify a major axis in said multi-dimensional cluster, wherein said cross-sectional partition is parallel to said major axis, and wherein said eight program instructions is stored on said computer readable media.

* * * * *